(12) United States Patent
Rajurkar et al.

(10) Patent No.: US 8,761,788 B2
(45) Date of Patent: Jun. 24, 2014

(54) METHODS AND APPARATUSES FOR DATA THROUGHPUT OPTIMIZATION IN DSDS SCENARIOS

(75) Inventors: Anand Rajurkar, Hyderabad (IN);
Bhaskara V. Batchu, Hyderabad (IN);
Aditya Bohra, Hyderabad (IN); Nitin Sachdeva, Hyderabad (IN); Neha Goel, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 13/469,421

(22) Filed: May 11, 2012

(65) Prior Publication Data
US 2013/0303181 A1 Nov. 14, 2013

(51) Int. Cl.
*H04W 72/00* (2009.01)
(52) U.S. Cl.
USPC .................................................. 455/452.1
(58) Field of Classification Search
USPC ................ 455/450, 452.1, 454, 458, 127.5
See application file for complete search history.

(56) References Cited

U.S. PATENT DOCUMENTS

| | | | |
|---|---|---|---|
| 8,064,405 B2 | 11/2011 | Parekh et al. | |
| 8,155,652 B2 | 4/2012 | Parekh et al. | |
| 2009/0093217 A1 | 4/2009 | Shin | |
| 2011/0217969 A1 | 9/2011 | Spartz et al. | |
| 2011/0317635 A1 | 12/2011 | Swaminathan | |
| 2012/0027003 A1 | 2/2012 | Chin et al. | |
| 2012/0039261 A1 | 2/2012 | Chin et al. | |

OTHER PUBLICATIONS

Ericsson: "Dual-SIM Dual-Standby UEs and their impact on the RAN", 3GPP Draft; R2-115375 Dual-SIM Dual-Standby UES and Their Impact on the RAN, 3rd Generation Partnership Project (3GPP), Mobile Competence Centre ; 650, Route Des Lucioles ; F-06921 Sophia-Antipolis Cedex ; France, vol. Ran WG2, No. Zhuhai; Oct. 10, 2011, Oct. 3, 2011, XP050540879, [retrieved on Oct. 3, 2011].
International Search Report and Written Opinion—PCT/US2013/040602—ISA/EPO—Sep. 3, 2013.

*Primary Examiner* — Joel Ajayi
(74) *Attorney, Agent, or Firm* — Donald C. Kordich (57) ABSTRACT

Aspects of the present disclosure provide methods and apparatuses for improved throughput for network subscriptions in multi-SIM, multi-standby wireless devices by altering a tune away frequency to another network subscription based on throughput level or communication link parameters. For example, the present application provides a method of tune away in a wireless system, which includes initiating a data session via a first subscription in a multi-subscriber identity module, multi-standby user equipment, determining that a data rate associated with the data session is less than a threshold data rate value, establishing a modified tune away frequency based on the determining, and tuning a radio resource away to a second subscription based on the modified tune away frequency. Through such operation, throughput on an active subscription in such user equipment can be dynamically maximized.

18 Claims, 9 Drawing Sheets

METHODS AND APPARATUSES FOR DATA THROUGHPUT OPTIMIZATION IN DSDS SCENARIOS

BACKGROUND

1. Field

Aspects of the present disclosure relate generally to wireless communication systems, and more particularly, to tune away in multi-SIM devices.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Additionally, some wireless devices are configured to facilitate communication on two separate networks via two separate subscriptions. For instance, dual-subscriber identity module (SIM), dual standby (DSDS) devices may include two SIM cards—one card for a first subscription and a second card for a second subscription. Furthermore, each subscription may be associated with one or more technology types. For example, a first subscription may exclusively support 2 G communication technology, such as Global System for Mobile Communications (GSM), while the second subscription may support one or more 3 G communication technologies (e.g. Wideband Code Division Multiple Access (WCDMA)) and 2 G communication technology.

In DSDS devices, a user may establish a call, such as a voice call, data call, data session, text messaging session, or any other data transfer session, via one of the two subscriptions. Because most DSDS devices contain a single radio resource, such as a transceiver, where a first subscription has established an ongoing call with a first subscription network, the UE must tune the transceiver away to the second subscription to receive necessary paging signals and to transmit, for example, message acknowledgement signals and/or measurement indication signals. Therefore, while the first subscription continues an ongoing call, the transceiver may periodically tune away from the first subscription to the second subscription to receive such necessary paging and/or control information.

Therefore, in DSDS devices, a user may engage in a data call via a first subscription, but must intermittently halt the data session to tune away to receive control data associated with the second subscription, which is typically in idle mode. This tune away may lead to reduction in data throughput on the first subscription for its ongoing data call, as no data transfer takes place relative to the data call while the device tunes away to the second subscription. What is more, the second subscription may hold the radio resources for a long period of time in order to complete software processing related to base station registration, which exacerbates the reduced data throughput problem on the first subscription. Tune away cannot be avoided completely, however, as the second subscription must periodically receive essential control data from its network, such as paging messages and the like.

Thus, methods and apparatuses are needed to allow for increased performance on the first technology as it continues an active data session while allowing the second subscription to tune away to receive essential messages.

SUMMARY

Aspects of the present disclosure generally provide methods and apparatuses for improved throughput for network subscriptions in multi-SIM, multi-standby wireless devices by altering a tune away frequency to another network subscription based on throughput level or communication link parameters. For example, the present disclosure introduces a method of tune away in a wireless system, which includes initiating a data session via a first subscription in a multi-subscriber identity module (SIM), multi-standby user equipment (UE), determining that a data rate associated with the data session is less than a threshold data rate value, establishing a modified tune away frequency based on the determining, and tuning a radio resource away to a second subscription based on the modified tune away frequency.

In a further aspect, the present disclosure provides for an apparatus for supporting tune away in a wireless system, which includes means for initiating a data session via a first subscription in a multi-SIM, multi-standby UE, means for determining that a data rate associated with the data session is less than a threshold data rate value, means for establishing a modified tune away frequency based on the determining, and means for tuning a radio resource away to a second subscription based on the modified tune away frequency.

Furthermore, provided herein is a computer program product, including a computer-readable medium comprising code for initiating a data session via a first subscription in a multi-SIM, multi-standby UE, determining that a data rate associated with the data session is less than a threshold data rate value, establishing a modified tune away frequency based on the determining, and tuning a radio resource away to a second subscription based on the modified tune away frequency.

In addition, the present disclosure contemplates an apparatus for tune away in wireless communications, which includes at least one processor and a memory coupled to the at least one processor, wherein the at least one processor is configured to initiate a data session via a first subscription in a multi-SIM, multi-standby user equipment, determine that a data rate associated with the data session is less than a threshold data rate value, establish a modified tune away frequency based on the determining, and tune a radio resource away to a second subscription based on the modified tune away frequency.

Through these and related aspects, data throughput on a first subscription may be increased by varying a tune away frequency, or slot cycle index, associated with the second subscription on the UE.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure presents methods and apparatuses for improved tune away in DSDS devices. Specifically, the present disclosure provides methods and apparatuses for reducing tune away frequency by increasing the Slot Cycle Index (SCI) of a second subscription. In an aspect, the SCI may be increased by a factor of "x" to query the network for pages at 1/x times the original rate. The value of x, and thus the frequency of tune away, may be determined on the basis of base station support and/or the conditions of the second subscription communication channel. For example, where the channel conditions are ideal, the value of x may be increased, and the frequency of tune away correspondingly lessened, without significant risk of missing paging or control information. Furthermore, the second subscription may defer registration processes to a later stage where such a delay is allowed by the technology associated with the second technology network. As such, throughput on the first subscription can be improved while ensuring that the second subscription receives important control and/or paging information.

Figure 1:
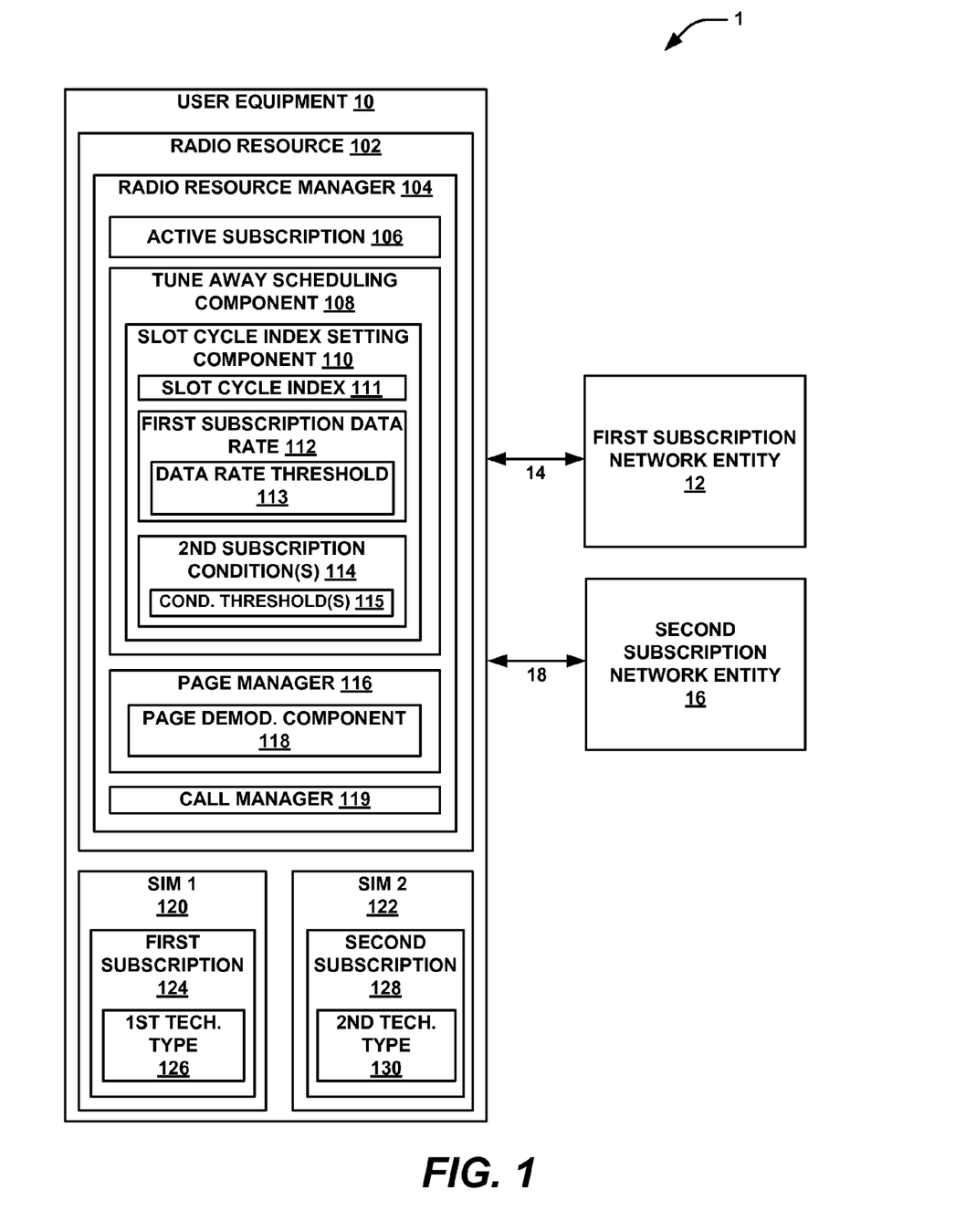
FIG. 1 is a block diagram illustrating an example wireless system of aspects of the present disclosure.

Referring to FIG. 1, a wireless communication system 1 is illustrated that enables improved radio resource management on one or more UEs. System 1 includes a UE 10 that communicates with one or more network entities, such as first subscription network entity 12 and/or second subscription network entity 16 to receive wireless network access. In some examples, such communication may occur on one or more wireless links 14 and/or 18. In a further aspect, first subscription network entity 12 and/or second subscription network entity 16 may include one or more of any type of network component, such as an access point, including a base station (BS) or NodeB, a relay, a peer-to-peer device, a radio network controller (RNC), an authentication, authorization and accounting (AAA) server, a mobile switching center (MSC), etc., that can enable UE 10 to communicate and/or that can establish and maintain a communication link, such as wireless links 14 and/or 18. In addition, UE 10 may be a multi-SIM, multi-standby device, such as a dual-SIM, dual standby (DSDS) device, which may allow the UE to communicate with multiple networks using a single UE 10.

Furthermore, UE 10 may include a shared radio resource 102, which may be configured to send communication signals associated with a first subscription 124 and/or a second subscription 128 to first and/or second subscription network entities 12 and 16, respectively. In an aspect, radio resource may be a transceiver and/or may include a receiver and transmitter, and may include transmitter and receiver chain components associated with one or both of first subscription 124 and/or second subscription 128.

In an additional aspect, radio resource manager 104 may include, or may alternatively be in communicative contact with, a radio resource manager 104, which may be configured to control the operation of radio resource 102. For example, in an aspect, radio resource manager 104 may include an active subscription 106, which radio resource manager 104 may set to indicate which subscription currently may utilize radio resource 102 to transmit or receive signals from a corresponding subscription network. Furthermore, in an aspect, radio resource manager 104 may include a tune away scheduling component 108, which may be configured to manage tune away from one subscription to another subscription—for example, from first subscription 124 to second subscription 128.

In an aspect, tune away scheduling component 108 may base its tune away scheduling on a slot cycle index 111 in a slot cycle index setting component 110. In an aspect, slot cycle index 111 may define the frequency and/or duration of tune away from one subscription to another and may be a slot cycle index associated with, for example, second subscription 128. In an additional aspect, slot cycle index 111 may be dynamic, which may mean that slot cycle index setting component 110 may vary the slot cycle index 111 based on one or more factors, such as, but not limited to, a first subscription data rate 112 and/or second subscription channel conditions 114. For example, where the first subscription data rate 112 is less than (or, in some examples, equal to) a data rate threshold 113, slot cycle index setting component 110 may increase the slot cycle index 111 associated with the second subscription 128. In an additional or alternative aspect, where one or more second subscription conditions 114 are less that (or, in some examples, equal to) one or more condition thresholds 115, slot cycle index setting component 110 may likewise increase the slot cycle index 111. In some non-limiting examples, the one or more second subscription conditions 114 may include a second subscription link quality, throughput level, cyclic redundancy check pass rate, or any other parameter that may indicate the quality of the communication link between the second subscription on the UE and the second subscription network.

Furthermore, slot cycle index 111 may be modeled according to a parameter x, such as by the frequency algorithm 1/x, such that where x increases, the slot cycle index decreases proportionally. Therefore, by adjusting x according to, for example, a first subscription data rate 112 and/or one or more second subscription conditions 114, battery power may be saved and throughput on the active first subscription may be increased.

In another aspect, radio resource manager 104 may include a page manager 116, which may manage the reception and processing of one or more page indicators or pages. In an aspect, such pages or page indicators indicate the existence of an incoming call destined for one of the subscriptions on UE 10 (e.g. first subscription 124 and/or second subscription 128). In an aspect, page manager 116 may receive and decode a page indicator at a page decoding component 118 and may process the page to determine whether radio resource 102 should be handed over to the target subscription of the page for potential call execution.

In an additional aspect, radio resource manager 120 may include a call manager 119, which may manage a call—such as, but not limited to, a voice call—on one subscription. Additionally, call manager 119 may indicate completion of the call to other components (e.g. data session resuming component 11) that may tune radio resource 102 to another subscription to engage in a further data session.

In another aspect, user equipment 10 may include one or more subscriber identity modules (SIMs), such as a first SIM 120 and a second SIM 122. In some aspects, however, UE 10 may include more than two SIMs. Furthermore, first SIM 120 may manage a first subscription (SUB 1) 124 associated with a first technology type 126 and second SIM 122 may manage a second subscription 128 associated with a second technology type 130. In an aspect, first technology type 126 and second technology type 130 may be any wireless technology type, may be the same technology type, or may be different technology types. In a specific non-limiting example, first technology type 126 may be GSM and second technology type 130 may be WCDMA. Furthermore, second technology type 130 may be a 3G technology type, such as, but not limited to, data optimized (DO), WCDMA, Time Division Synchronous Code Division Multiple Access (TDS-CDMA), or any other third-generation mobile communications technology. Additionally, in some examples, first technology type 126 may be a 2G technology type, such as, but not limited to, GSM, GPRS, or EDGE. Furthermore, first technology type 124 or second technology type 130 may be a 4G technology, such as, but not limited to, Long-Term Evolution (LTE), Time-Division Long-Term Evolution (TD-LTE), or any other fourth-generation mobile communications technology. In addition, a user, manufacturer, network, or other configuration management entity may set a designated data service (DDS) for UE 10 as one of the multiple subscriptions on UE 10.

By storing and utilizing protocol and communication standard information relating to first technology type 126 and second technology type 130, UE 10 may communicate effectively with all communication technology types supported or subscribed to by UE 10. As such, radio resource manager 104 (through, for example, tune away scheduling component 108) may manage transfer of radio resource 102 from first subscription 124 to second subscription 128.

Figure 2:
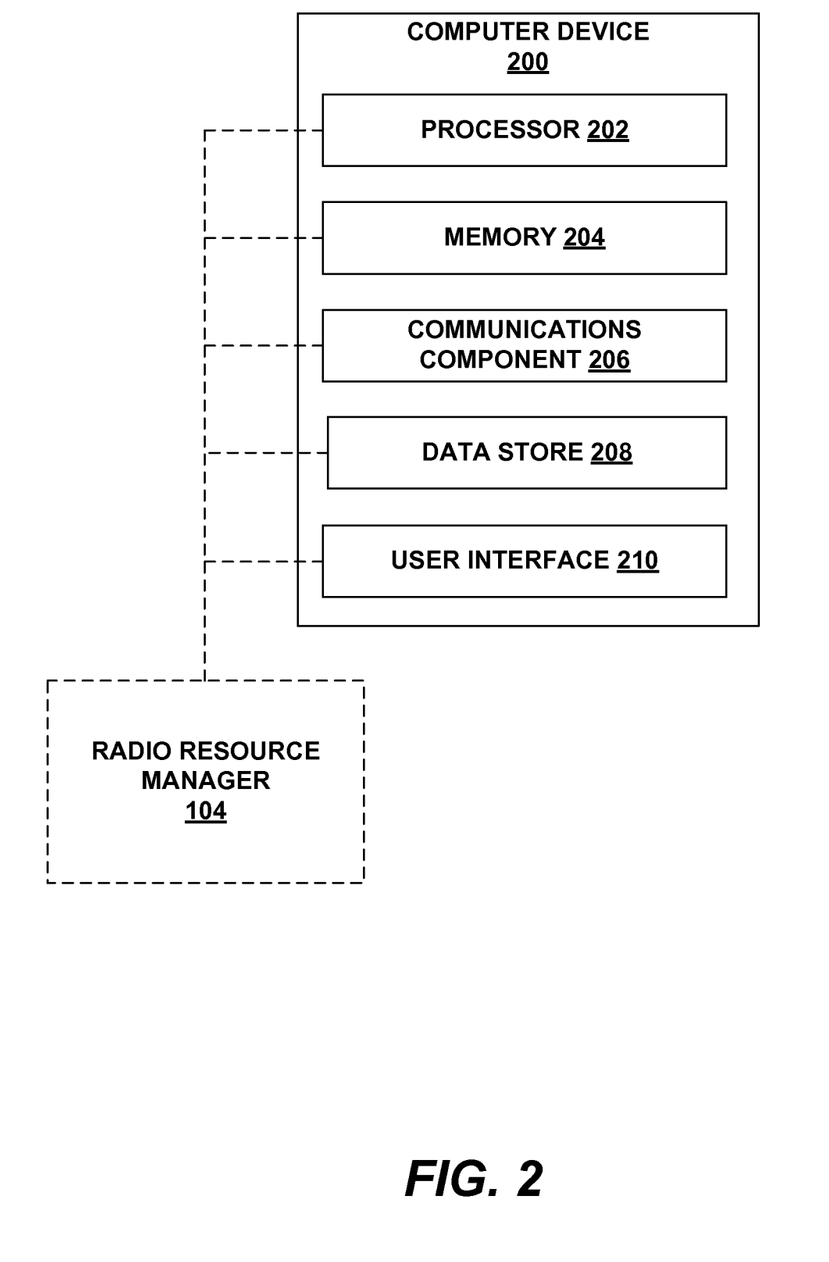
FIG. 2 is a block diagram illustrating an example of an example computer device in aspects of the present disclosure.

Referring to FIG. 2, in one aspect, any of UE 10, or the one or more network entities, such as first subscription network entity 12 and/or second subscription network entity 16 (FIG. 1) may be represented by a specially programmed or configured computer device 200. Computer device 200 includes a processor 202 for carrying out processing functions associated with one or more of components and functions described herein. Processor 202 can include a single or multiple set of processors or multi-core processors. Moreover, processor 202 can be implemented as an integrated processing system and/or a distributed processing system. Additionally, processor 202 may be configured to concatenate data received over a frame or several frames during a communication.

Computer device 200 further includes a memory 204, such as for storing data used herein and/or local versions of applications being executed by processor 202. Memory 204 can include any type of memory usable by a computer, such as random access memory (RAM), read only memory (ROM), tapes, magnetic discs, optical discs, volatile memory, non-volatile memory, and any combination thereof.

Further, computer device 200 includes a communications component 206 that provides for establishing and maintaining communications with one or more parties utilizing hardware, software, and services as described herein. Communications component 206 may carry communications between components on computer device 200, as well as between computer device 200 and external devices, such as devices located across a communications network and/or devices serially or locally connected to computer device 200. For example, communications component 206 may include one or more buses, and may further include transmit chain components and receive chain components associated with a transmitter and receiver, respectively, or a transceiver, operable for interfacing with external devices. In an additional aspect, communications component 206 may be configured to receive one or more pages and/or page indicators from one or more subscriber networks. In a further aspect, such a page or page indicator may correspond to the second subscription and may be received via the first communication technology type communication services.

Additionally, computer device 200 may further include a data store 208, which can be any suitable combination of hardware and/or software, that provides for mass storage of information, databases, and programs employed in connection with aspects described herein. For example, data store 208 may be a data repository for applications not currently being executed by processor 202.

Computer device 200 may additionally include a user interface component 210 operable to receive inputs from a user of computer device 200, and further operable to generate outputs for presentation to the user. User interface component 210 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 210 may include one or more output devices, including but not limited to a display, a speaker, a haptic feedback mechanism, a printer, any other mechanism capable of presenting an output to a user, or any combination thereof. In an additional aspect, a user using the user interface 210 may set one of a first subscription or a second subscription as a dedicated data service (DDS) for the computer device 200.

In a mobile station implementation, such as for UE 10 of FIG. 1, computer device 200 may include radio resource manager 104 (FIG. 1), such as in specially programmed computer readable instructions or code, firmware, hardware, or some combination thereof.

Figure 3:
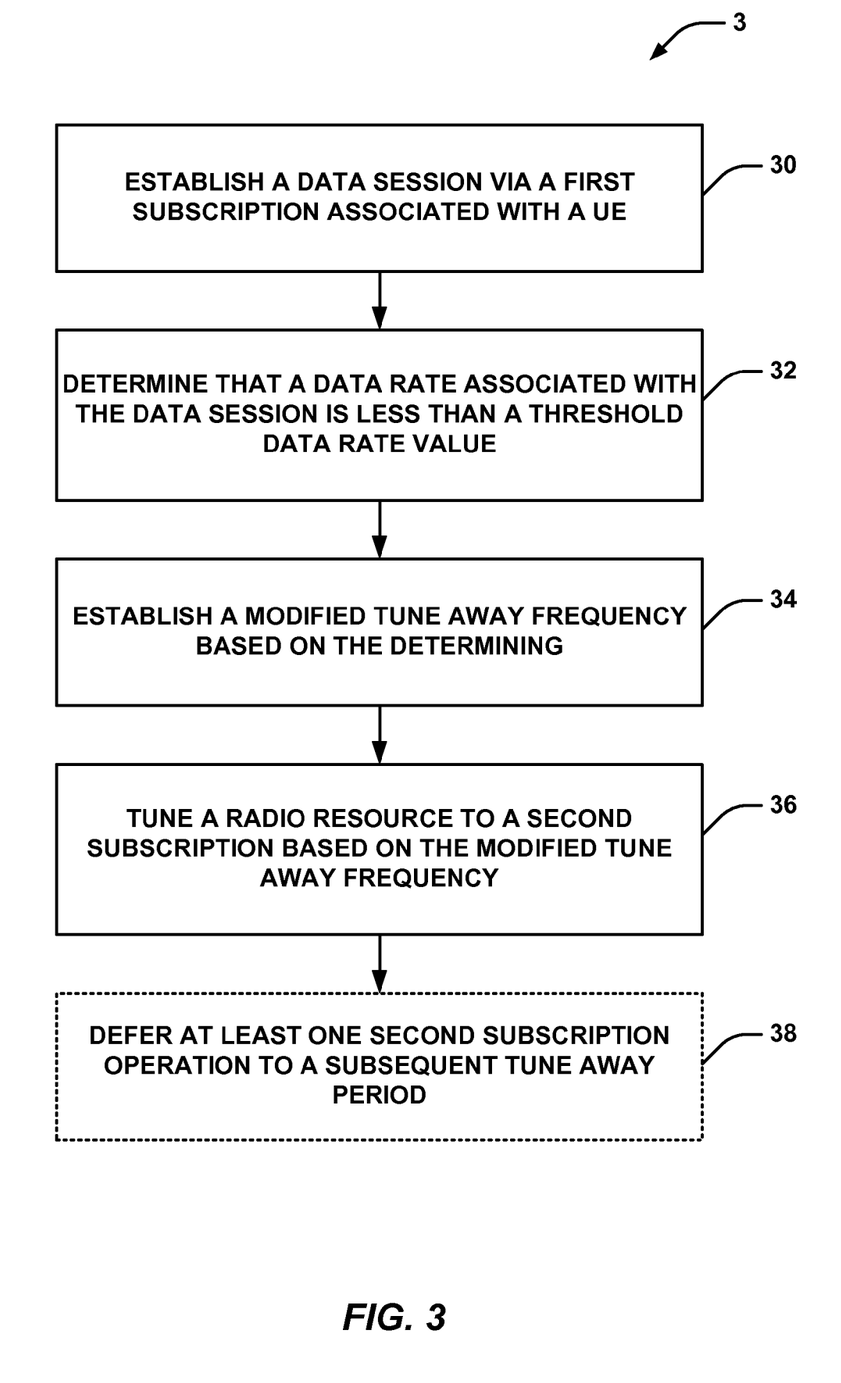
FIG. 3 is a flow diagram illustrating aspects of a method for improving radio resource management in a multi-SIM UE as provided by the present disclosure.

Referring to FIG. 3, an example methodology for improved radio resource management and improved active session throughput in a multi-SIM UE is provided. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

In an aspect, at block 30, a UE (e.g. UE 10, FIG. 1) may establish a data session via a first subscription associated with the UE. In an aspect, the first subscription may be designated as the designated data service of the UE and may therefore be the preferred subscription for engaging in UE data sessions. In some examples, during the data session, the UE may tune a shared radio resource of the UE away from the data session of the first subscription to attempt to receive a page for a second subscription associated with the UE. In an aspect, such tune away may be performed periodically to ensure that the second subscription does not miss important control information or pages from its network.

Furthermore, at block 32, the UE may determine that a data rate associated with the data session is less than a threshold data rate value. In some aspects, the threshold data rate value may be preconfigured and stored by the UE or a user, or may be received from a network and stored. In addition, the threshold data rate value may be dynamic in that it may change as a function of time. Further, in an alternative aspect of block 32, the UE may determine that one or more second subscription conditions have fallen below one or more condition thresholds, as described in connection to FIG. 1 above.

Based at least on the determining of block 32, the UE may establish a modified tune away frequency at block 34. In an aspect, the UE may establish the modified tune away frequency by adjusting the x parameter of the slot cycle index algorithm, which may be represented as 1/x. In an aspect, the x parameter may vary in value, by non-limiting example, as a function of the degree of depleted first subscription throughput and/or one or more second subscription conditions. Furthermore, at block 36, the UE may tune a radio resource of the UE to the second subscription based on at least the modified tune away frequency.

In an additional aspect, during a tune away period wherein the second subscription utilizes the radio resource, the second subscription may hold such a radio resource for a finite length of time, which may be referred to as a tune away period. Because the tune away period may not be great enough in length to perform the totality of present operations to be performed by the second subscription, performance of at least a second of such operations may be deferred to one or more subsequent tune away periods at optional block 38. For example, where a second subscription must perform an upload measurement report transmission of 20 ms and a page read operation of 20 ms where the finite tune away period is 25 ms in length, at least a portion of the page read operation may be deferred to a subsequent tune away period. In an alternative or additional aspect, a singe operation on the second subscription that has an operation length longer than the tune away period may defer a portion of the operation performance to a subsequent tune away period. For example, a second subscription on the multi-SIM UE may attempt to perform a cell reselection procedure that may take a total of 30 ms. Where the tune away period is 20 ms, at least a portion, e.g. 10 ms, of the reselection procedure may be deferred to a subsequent tune away period.

In an additional aspect, the UE may resume the data session on the first subscription upon completion of the tune away to the second subscription upon expiry of the tune away period and/or the completion of page read. In an additional aspect, before resuming the data session but after the data session has concluded on the second subscription, the UE may perform cell reselection procedures for the first subscription. Thus, according to aspects of the present methodology 3, a multi-SIM, multi-standby device may increase throughput on a first subscription engaged in an active call by modifying a tune away frequency, or slot cycle index, associated with a radio resource on the UE.

Figure 4:
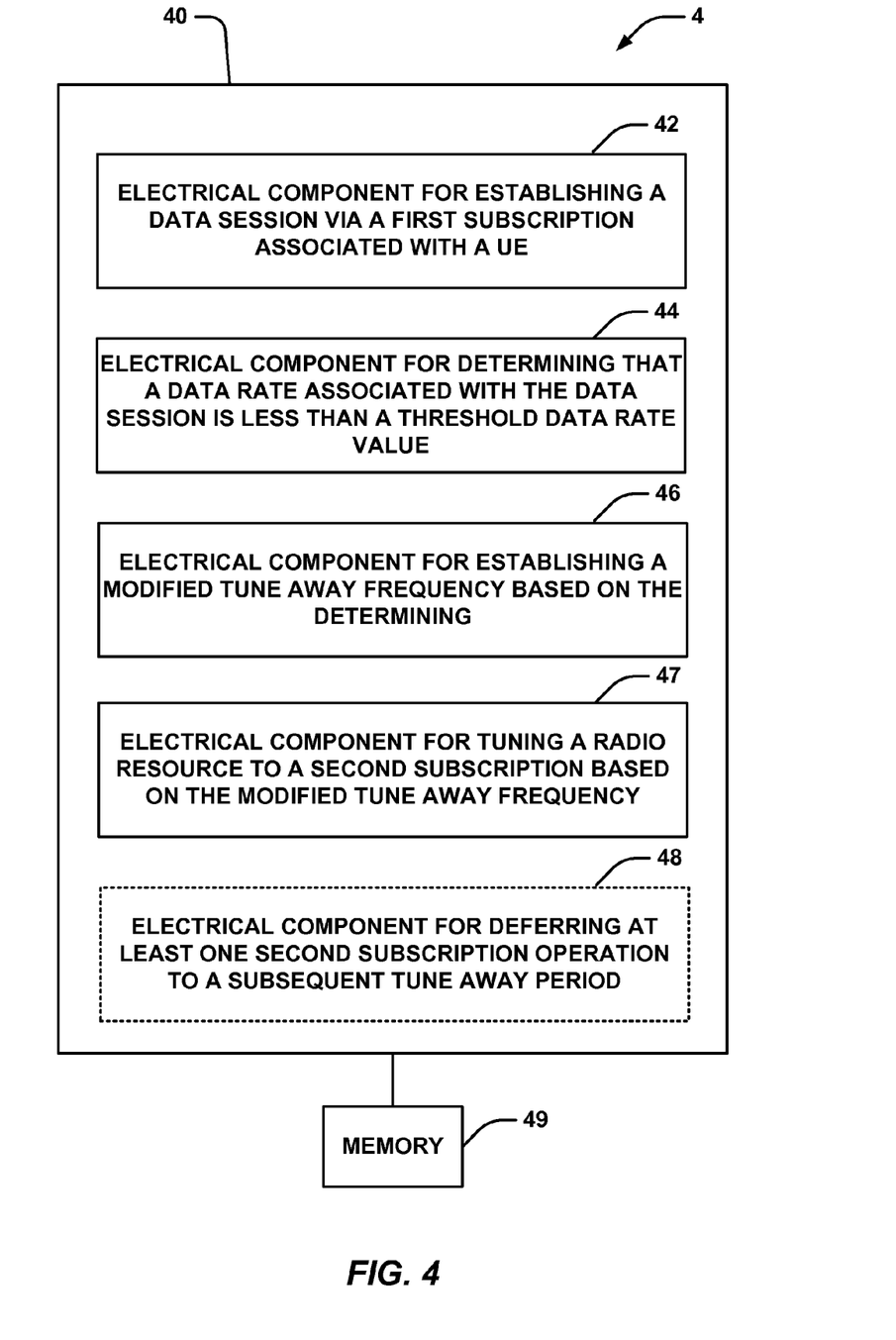
FIG. 4 is a component diagram illustrating aspects of a logical grouping of electrical components as contemplated by the present disclosure.

Referring to FIG. 4, an example system 4 is displayed for improved data throughput through improved radio resource management in multi-SIM UEs. For example, system 4 can reside at least partially within one or more network entities. It is to be appreciated that system 4 is represented as including functional blocks, which can be functional blocks that represent functions implemented by a processor, software, or combination thereof (e.g., firmware). System 4 includes a logical grouping 40 of electrical components that can act in conjunction. For instance, logical grouping 40 can include an electrical component 42 for establishing a data session via a first subscription associated with a UE. In an aspect, electrical component 42 may comprise radio resource manager 102 (FIG. 1) and/or communications component 206 (FIG. 2). In addition, logical grouping 40 can include an electrical component 44 for determining that a data rate associated with the data session is less than a threshold data rate value. In an aspect, electrical component 44 may comprise tune away scheduling component 108 (FIG. 1). In an additional aspect, logical grouping 40 can include an electrical component 46 for establishing a modified tune away frequency based on the determining. In an aspect, electrical component 46 may comprise tune away scheduling component 108 (FIG. 1). Furthermore, logical grouping 40 can include an electrical component 47 for tuning a radio resource to a second subscription based on the modified tune away frequency. In an aspect, electrical component 47 may comprise radio resource manager 104 and/or tune away scheduling component 108 (FIG. 1) therein. In an additional optional aspect, logical grouping 40 can include an electrical component 48 for deferring at least one second subscription operation, or part of a subscription operation, to a subsequent tune away period. In an aspect, electrical component 48 may comprise tune away scheduling component 108 (FIG. 1).

Additionally, system 4 can include a memory 49 that retains instructions for executing functions associated with the electrical components 42, 44, 46, 47, and 48, stores data used or obtained by the electrical components 42, 44, 46, 47, and 48, etc. While shown as being external to memory 49, it is to be understood that one or more of the electrical components 42, 44, 46, 47, and 48 can exist within memory 49. In one example, electrical components 42, 44, 46, 47, and 48 can comprise at least one processor, or each electrical component 42, 44, 46, 47, and 48 can be a corresponding module of at least one processor. Moreover, in an additional or alternative example, electrical components 42, 44, 46, 47, and 48 can be a computer program product including a computer readable medium, where each electrical component 42, 44, 46, 47, and 48 can be corresponding code.

Figure 5:
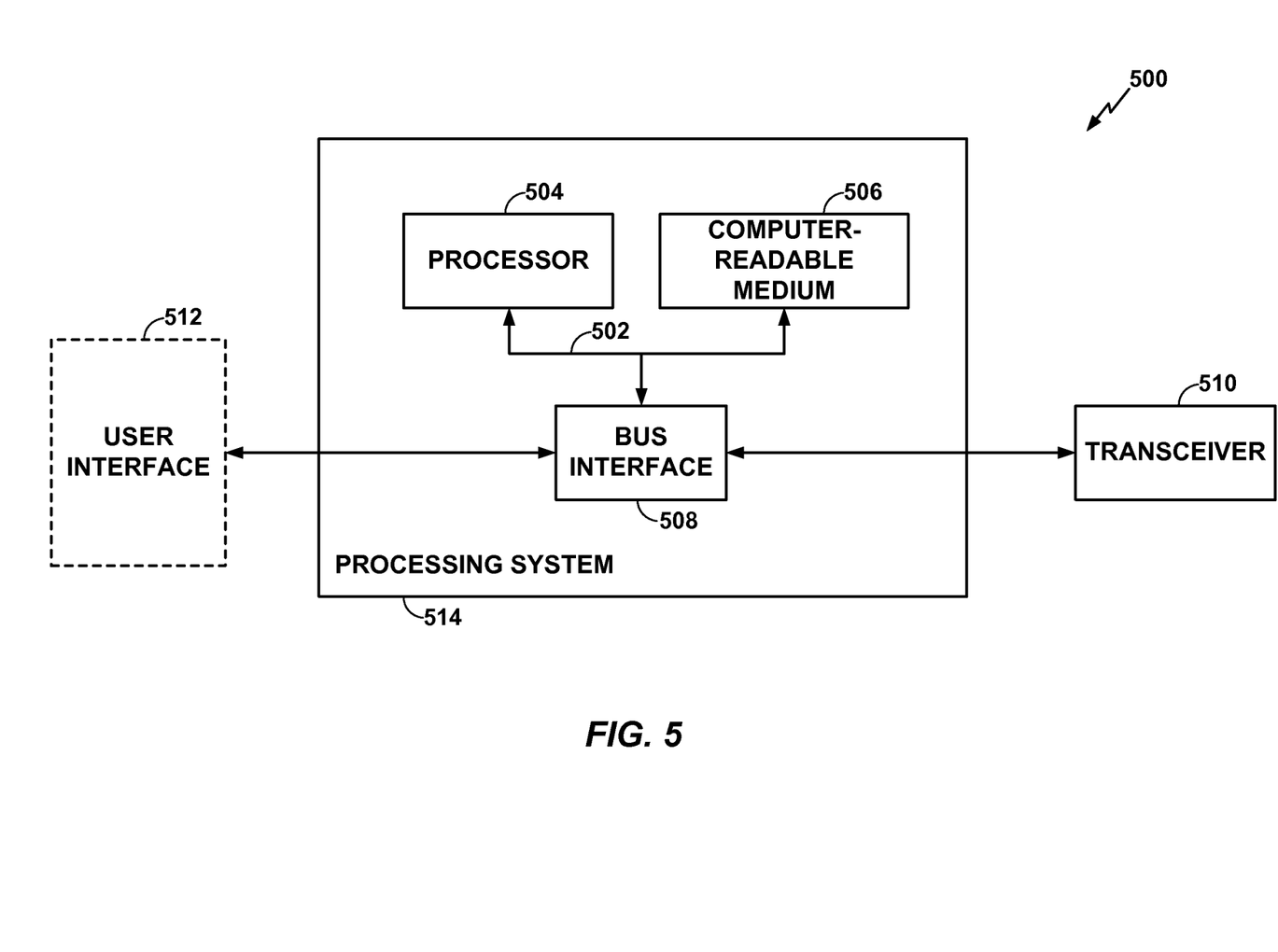
FIG. 5 is a block diagram illustrating an example of a hardware implementation for an apparatus employing a processing system.

FIG. 5 is a block diagram illustrating an example of a hardware implementation for an apparatus 500 employing a processing system 514 for carrying out aspects of the present disclosure, such as methods for improved radio resource management in DSDS devices. In this example, the processing system 514 may be implemented with a bus architecture, represented generally by a bus 502. The bus 502 may include any number of interconnecting buses and bridges depending on the specific application of the processing system 514 and the overall design constraints. The bus 502 links together various circuits including one or more processors, represented generally by the processor 504, and computer-readable media, represented generally by the computer-readable medium 506. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described infra for any particular apparatus. The computer-readable medium 506 may also be used for storing data that is manipulated by the processor 504 when executing software.

Figure 6:
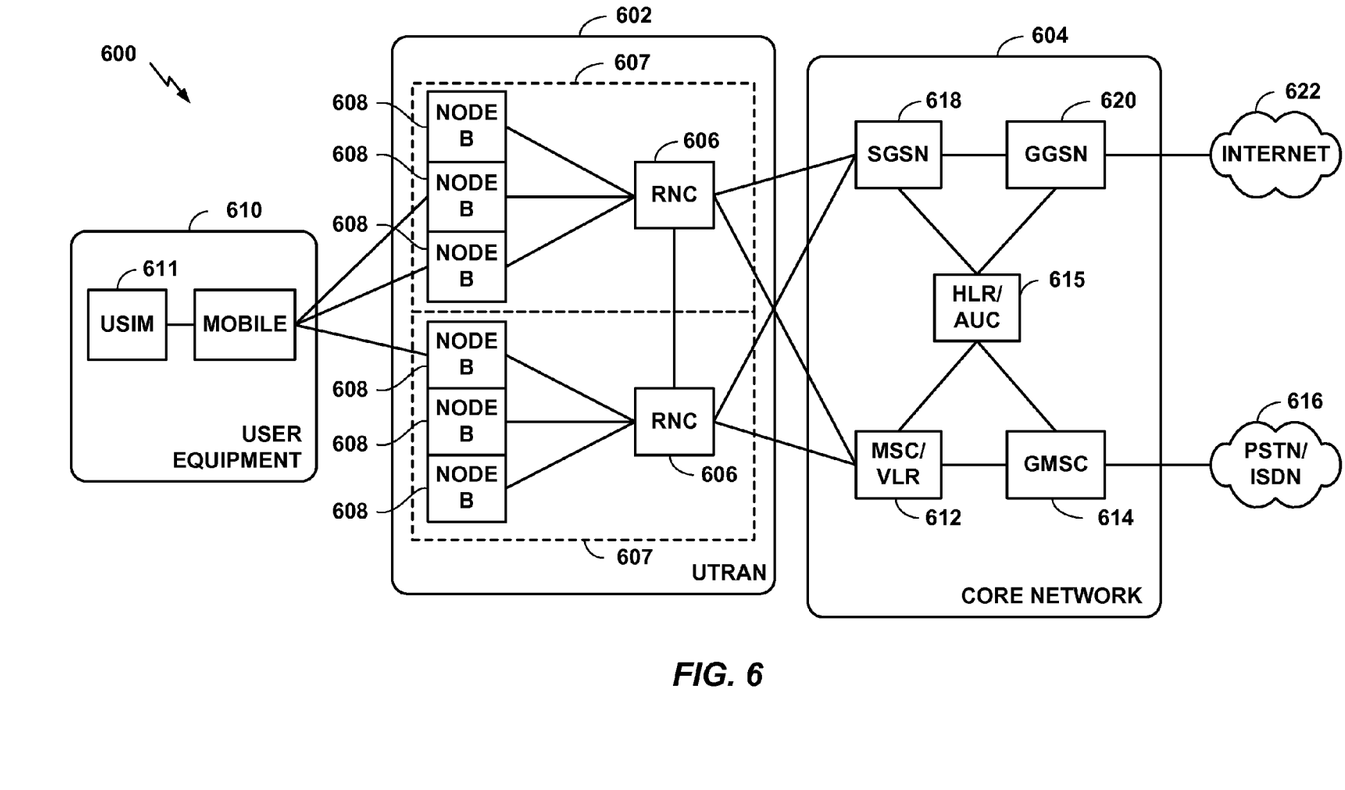
FIG. 6 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 6 are presented with reference to a UMTS system 600 employing a W-CDMA air interface, which may correspond to one or both of first and/or second subscriptions 124 and/or 128 of FIG. 1 and may facilitate execution of one or methods contemplated by the present disclosure. A UMTS network includes three interacting domains: a Core Network (CN) 604, a UMTS Terrestrial Radio Access Network (UTRAN) 602, and User Equipment (UE) 610. In an aspect, UE 610 may be UE 10 (FIG. 1), and UMTS 602 may comprise first and/or second subscription network entities 12 and/or 16 (FIG. 1). In this example, the UTRAN 602 provides various wireless services including telephony, video, data, messaging, broadcasts, and/or other services. The UTRAN 602 may include a plurality of Radio Network Subsystems (RNSs) such as an RNS 607, each controlled by a respective Radio Network Controller (RNC) such as an RNC 606. Here, the UTRAN 602 may include any number of RNCs 606 and RNSs 607 in addition to the RNCs 606 and RNSs 607 illustrated herein. The RNC 606 is an apparatus responsible for, among other things, assigning, reconfiguring, and releasing radio resources within the RNS 607. The RNC 606 may be interconnected to other RNCs (not shown) in the UTRAN 602 through various types of interfaces such as a direct physical connection, a virtual network, or the like, using any suitable transport network.

Communication between a UE 610 and a NodeB 608 may be considered as including a physical (PHY) layer and a medium access control (MAC) layer. Further, communication between a UE 610 and an RNC 606 by way of a respective NodeB 608 may be considered as including a radio resource control (RRC) layer. In the instant specification, the PHY layer may be considered layer 1; the MAC layer may be considered layer 6; and the RRC layer may be considered layer 3. Information hereinbelow utilizes terminology introduced in the RRC Protocol Specification, 3GPP TS 65.331 v9.1.0, incorporated herein by reference.

The geographic region covered by the RNS 607 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 608 are shown in each RNS 607; however, the RNSs 607 may include any number of wireless Node Bs. The Node Bs 608 provide wireless access points to a CN 604 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 610 may further include a universal subscriber identity module (USIM) 611, which contains a user's subscription information to a network. For illustrative purposes, one UE 610 is shown in communication with a number of the Node Bs 608. The DL, also called the forward link, refers to the communication link from a NodeB 608 to a UE 610, and the UL, also called the reverse link, refers to the communication link from a UE 610 to a NodeB 608.

The CN 604 interfaces with one or more access networks, such as the UTRAN 602. As shown, the CN 604 is a GSM core network. However, as those skilled in the art will recognize, the various concepts presented throughout this disclosure may be implemented in a RAN, or other suitable access network, to provide UEs with access to types of CNs other than GSM networks.

The CN 604 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 604 supports circuit-switched services with a MSC 612 and a GMSC 614. In some applications, the GMSC 614 may be referred to as a media gateway (MGW). One or more RNCs, such as the RNC 606, may be connected to the MSC 612. The MSC 612 is an apparatus that controls call setup, call routing, and UE mobility functions. The MSC 612 also includes a VLR that contains subscriber-related information for the duration that a UE is in the coverage area of the MSC 612. The GMSC 614 provides a gateway through the MSC 612 for the UE to access a circuit-switched network 616. The GMSC 614 includes a home location register (HLR) 615 containing subscriber data, such as the data reflecting the details of the services to which a particular user has subscribed. The HLR is also associated with an authentication center (AuC) that contains subscriber-specific authentication data. When a call is received for a particular UE, the GMSC 614 queries the HLR 615 to determine the UE's location and forwards the call to the particular MSC serving that location.

The CN 604 also supports packet-data services with a serving GPRS support node (SGSN) 618 and a gateway GPRS support node (GGSN) 620. GPRS, which stands for General Packet Radio Service, is designed to provide packet-data services at speeds higher than those available with standard circuit-switched data services. The GGSN 620 provides a connection for the UTRAN 602 to a packet-based network 622. The packet-based network 622 may be the Internet, a private data network, or some other suitable packet-based network. The primary function of the GGSN 620 is to provide the UEs 610 with packet-based network connectivity. Data packets may be transferred between the GGSN 620 and the UEs 610 through the SGSN 618, which performs primarily the same functions in the packet-based domain as the MSC 612 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 608 and a UE 610. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 610 provides feedback to the node B 608 over the HS-DPCCH to indicate whether it correctly decoded a packet on the downlink.

HS-DPCCH further includes feedback signaling from the UE 610 to assist the node B 608 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 608 and/or the UE 610 may have multiple antennas supporting MIMO technology. The use of MIMO technology enables the node B 608 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 610 to increase the data rate or to multiple UEs 610 to increase the overall system capacity. This is achieved by spatially precoding each data stream and then transmitting each spatially precoded stream through a different transmit antenna on the downlink. The spatially precoded data streams arrive at the UE(s) 610 with different spatial signatures, which enables each of the UE(s) 610 to recover the one or more the data streams destined for that UE 610. On the uplink, each UE 610 may transmit one or more spatially precoded data streams, which enables the node B 608 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
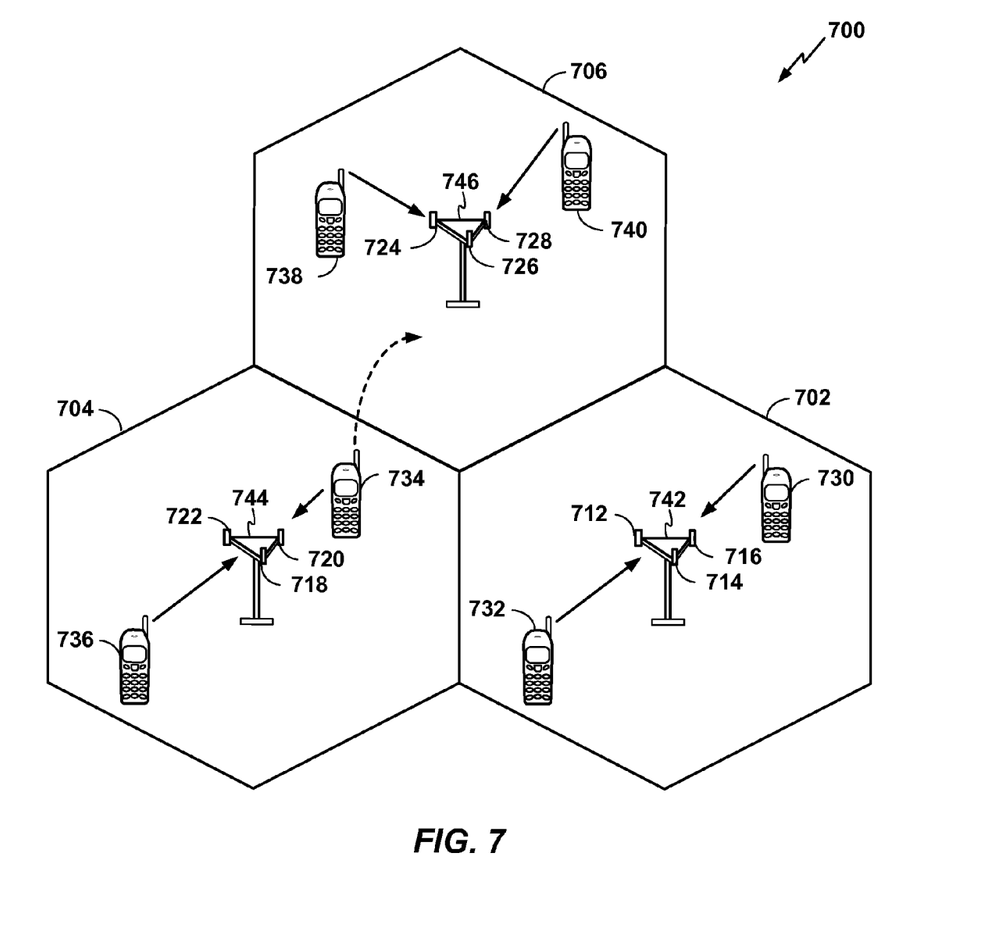
FIG. 7 is a conceptual diagram illustrating an example of an access network.

Referring to FIG. 7, an access network 700 in a UTRAN architecture is illustrated. The multiple access wireless communication system includes multiple cellular regions (cells), including cells 702, 704, and 706, each of which may include one or more sectors. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 718, 720, and 722 each correspond to a different sector. In cell 706, antenna groups 724, 726, and 728 each correspond to a different sector. The cells 702, 704 and 706 may include several wireless communication devices, e.g., User Equipment or UEs, which may be in communication with one or more sectors of each cell 702, 704 or 706. For example, UEs 730 and 732 may be in communication with NodeB 742, UEs 734 and 736 may be in communication with NodeB 744, and UEs 738 and 740 can be in communication with NodeB 746. Here, each NodeB 742, 744, 746 is configured to provide an access point to a core network for all the UEs 730, 732, 734, 736, 738, 740 in the respective cells 702, 704, and 706.

As the UE 734 moves from the illustrated location in cell 704 into cell 706, a serving cell change (SCC) or handover may occur in which communication with the UE 734 transitions from the cell 704, which may be referred to as the source cell, to cell 706, which may be referred to as the target cell. Management of the handover procedure may take place at the UE 734, at the Node Bs corresponding to the respective cells, at a radio network controller 606 (FIG. 6), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel DPCH or fractional downlink dedicated physical channel F-DPCH to the UE 734 may constitute the Active Set).

The modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
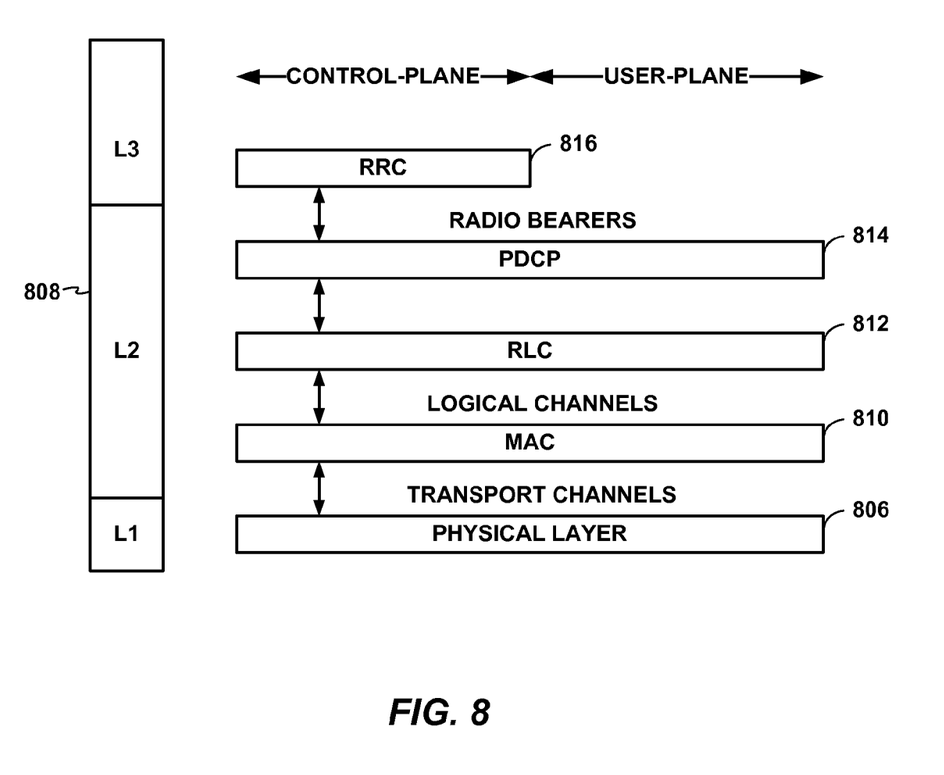
FIG. 8 is a conceptual diagram illustrating an example of a radio protocol architecture for the user and control plane.

The radio protocol architecture may take on various forms depending on the particular application. An example for an HSPA system will now be presented with reference to FIG. 8. FIG. 8 is a conceptual diagram illustrating an example of the radio protocol architecture for the user and control planes.

Turning to FIG. 8, the radio protocol architecture for the UE and node B is shown with three layers: Layer 1, Layer 2, and Layer 3. Layer 1 is the lowest lower and implements various physical layer signal processing functions. Layer 1 will be referred to herein as the physical layer 806. Layer 2 (L2 layer) 808 is above the physical layer 806 and is responsible for the link between the UE and node B over the physical layer 806.

In the user plane, the L2 layer 808 includes a media access control (MAC) sublayer 810, a radio link control (RLC) sublayer 812, and a packet data convergence protocol (PDCP) 814 sublayer, which are terminated at the node B on the network side. Although not shown, the UE may have several upper layers above the L2 layer 808 including a network layer (e.g., IP layer) that is terminated at a PDN gateway on the network side, and an application layer that is terminated at the other end of the connection (e.g., far end UE, server, etc.).

The PDCP sublayer 814 provides multiplexing between different radio bearers and logical channels. The PDCP sublayer 814 also provides header compression for upper layer data packets to reduce radio transmission overhead, security by ciphering the data packets, and handover support for UEs between NodeBs. The RLC sublayer 812 provides segmentation and reassembly of upper layer data packets, retransmission of lost data packets, and reordering of data packets to compensate for out-of-order reception due to hybrid automatic repeat request (HARQ). The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

Figure 9:
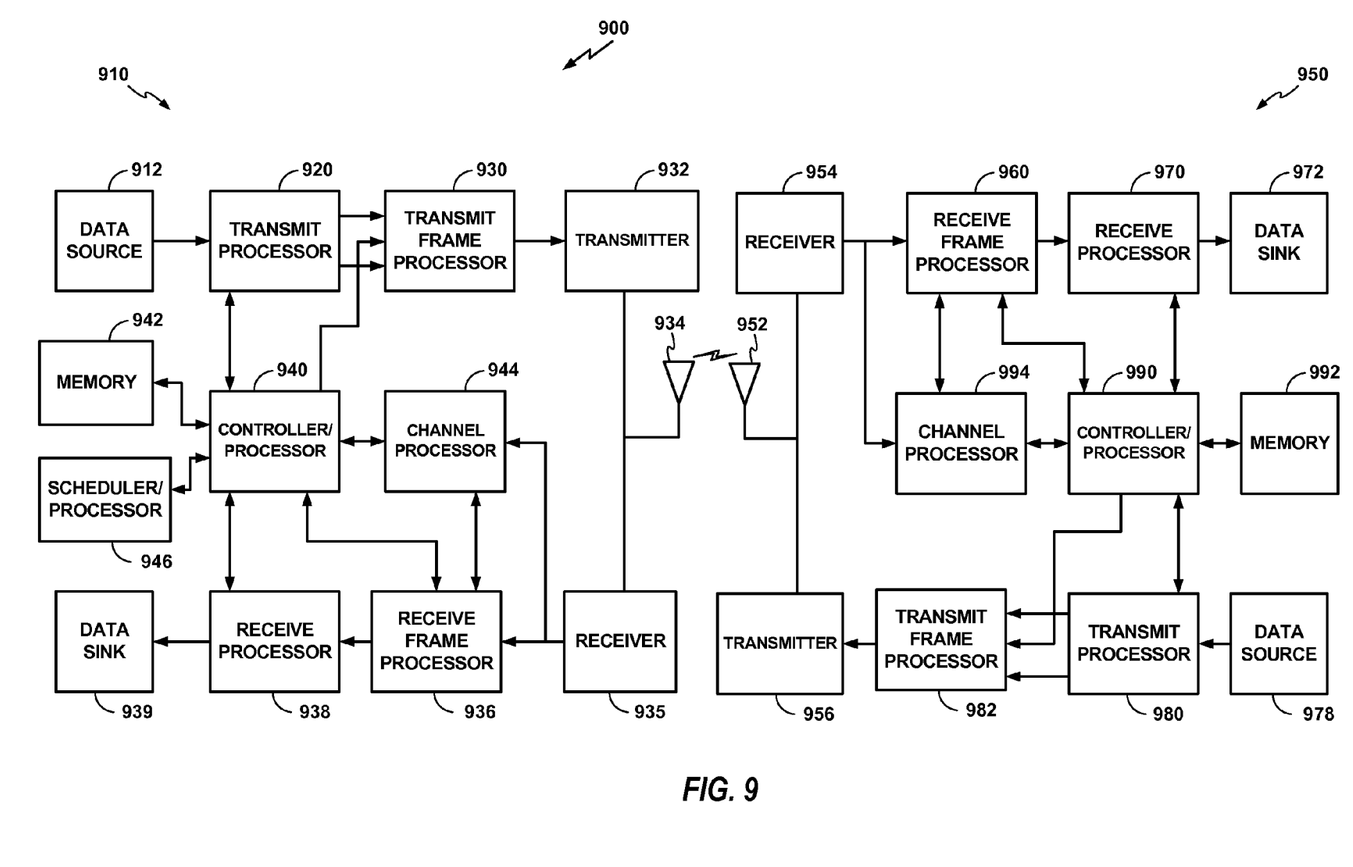
FIG. 9 is a block diagram conceptually illustrating an example of a Node B in communication with a UE in a telecommunications system.

FIG. 9 is a block diagram of a NodeB 910 in communication with a UE 950, where the NodeB 910 may be the NodeB 1008 in FIG. 6 and/or first and/or second subscription network entities 12 and/or 16 of FIG. 1 and/or FIG. 2, and the UE 950 may be the UE 610 in FIG. 6 and/or UE 10 of FIG. 1. In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the NodeB 910. More specifically, the receive processor 970 descrambles and despreads the symbols, and then determines the most likely signal constellation points transmitted by the NodeB 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the NodeB 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the NodeB 910 or from feedback contained in the midamble transmitted by the NodeB 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the NodeB 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the NodeB 910 and the UE 950, respectively. For example, the controller/processors 940 and 990 may provide various functions including timing, peripheral interfaces, voltage regulation, power management, and other control functions. The computer readable media of memories 942 and 992 may store data and software for the NodeB 910 and the UE 950, respectively. A scheduler/processor 946 at the NodeB 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of managing a user equipment (UE), comprising:
    initiating a data session via a first subscription associated with a first subscriber identity module (SIM) of multiple SIMs of the UE, wherein each SIM of the multiple SIMs is configured to communicate according to a corresponding radio access technology (RAT);
    determining that a data rate associated with the data session is less than a threshold data rate value;
    establishing a modified tune away frequency based on determining that the data rate is less than the threshold data rate value, wherein the modified tune away frequency defines a rate at which a radio resource of the UE is to be tuned from the first subscription to a second subscription associated with a second SIM of the multiple SIMs of the UE; and
    tuning the radio resource from the first subscription to the second subscription based on the modified tune away frequency.

2. The method of claim 1, wherein the modified tune away frequency is a modified Slot Cycle Index (SCI).

3. The method of claim 1,
    wherein the modified tune away frequency is dependent on a channel quality associated with the second subscription.

4. The method of claim 1, further comprising performing at least a part of a second subscription operation during a tune away period.

5. The method of claim 4, wherein the second subscription operation comprises one or more registration operations.

6. The method of claim 4, further comprising deferring at least one second subscription operation until a subsequent tune away period.

7. An apparatus for managing a user equipment (UE), comprising:
    means for initiating a data session via a first subscription associated with a first subscriber identity module (SIM) of multiple SIMs of the UE, wherein each SIM of the multiple SIMs is configured to communicate according to a corresponding radio access technology (RAT);
    means for determining that a data rate associated with the data session is less than a threshold data rate value;
    means for establishing a modified tune away frequency based on determining that the data rate is less than the threshold data rate value, wherein the modified tune away frequency defines a rate at which a radio resource of the UE is to be tuned from the first subscription to a second subscription associated with a second SIM of the multiples SIMs of the UE; and
    means for tuning the radio resource from the first subscription to the second subscription based on the modified tune away frequency.

8. The apparatus of claim 7, wherein the modified tune away frequency is a modified Slot Cycle Index (SCI).

9. The apparatus of claim 7,
    wherein the modified tune away frequency is dependent on a channel quality associated with the second subscription.

10. The apparatus of claim 7, further comprising means for performing at least a part of a second subscription operation during a tune away period.

11. The apparatus of claim 10, wherein the second subscription operation comprises one or more registration operations.

12. The apparatus of claim 10, further comprising means for deferring at least one second subscription operation until a subsequent tune away period.

13. A computer program product, comprising:
    a non-transitory computer-readable medium comprising code for:
        initiating a data session via a first subscription associated with a first subscriber identity module (SIM) of multiple SIMs of a user equipment (UE), wherein each SIM of the multiple SIMs is configured to communicate according to a corresponding radio access technology (RAT);
        determining that a data rate associated with the data session is less than a threshold data rate value;
        establishing a modified tune away frequency based on determining that the data rate is less than the threshold data rate value, wherein the modified tune away frequency defines a rate at which a radio resource of the UE is to be tuned from the first subscription to a second subscription associated with a second SIM of the multiple SIMs of the UE; and
        tuning the radio resource from the first subscription to the second subscription based on the modified tune away frequency.

14. The computer program product of claim 13, wherein the modified tune away frequency is a modified Slot Cycle Index (SCI).

15. The computer program product of claim 13, wherein the computer-readable medium further comprises code for performing at least a part of a second subscription operation during a tune away period.

16. An apparatus for managing a user equipment (UE), comprising:
    at least one processor; and
    a memory coupled to the at least one processor, wherein the at least one processor is configured to:
        initiate a data session via a first subscription associated with a first subscriber identity module (SIM) of multiple SIMs of the UE, wherein each SIM of the multiple SIMs is configured to communicate according to a corresponding radio access technology (RAT);
        determine that a data rate associated with the data session is less than a threshold data rate value;
        establish a modified tune away frequency based on determining that the data rate is less than the threshold data rate value, wherein the modified tune away frequency defines a rate at which a radio resource of the UE is to be tuned from the first subscription to a second subscription associated with a second SIM of the multiple SIMs of the UE; and tune the radio resource from the first subscription to the second subscription based on the modified tune away frequency.

17. The apparatus of claim 16, wherein the modified tune away frequency is a modified Slot Cycle Index (SCI).

18. The apparatus of claim 16, wherein the at least one processor is further configured to perform at least a part of a second subscription operation during a tune away period.

* * * * *